US010766719B2

(12) United States Patent
Genovese et al.

(10) Patent No.: US 10,766,719 B2
(45) Date of Patent: Sep. 8, 2020

(54) INDEPENDENT FLOOR STORAGE SYSTEM

(71) Applicant: Laidig Systems, Inc., Mishawaka, IN (US)

(72) Inventors: Michael Ryan Genovese, South Bend, IN (US); Andrew Pierce Sarell, Elkhart, IN (US); Thomas Walter Lindenman, South Bend, IN (US); Alan D. Amick, Granger, IN (US)

(73) Assignee: Laidig Systems, Inc., Mishawaka, IN (US)

( * ) Notice: Subject to any disclaimer, the term of this patent is extended or adjusted under 35 U.S.C. 154(b) by 0 days.

(21) Appl. No.: 16/683,601

(22) Filed: Nov. 14, 2019

(65) Prior Publication Data

US 2020/0247622 A1 Aug. 6, 2020

Related U.S. Application Data

(60) Provisional application No. 62/799,796, filed on Feb. 1, 2019.

(51) Int. Cl.
*B65G 65/46* (2006.01)

(52) U.S. Cl.
CPC .... *B65G 65/463* (2013.01); *B65G 2814/0316* (2013.01)

(58) Field of Classification Search
CPC .......... B65G 65/463; B65G 2814/0316; B65D 88/28; B65D 88/54; B65D 88/02; B65D 88/26; B65D 88/546; B65D 2231/007; B65D 2231/008; B67D 2210/0028; E04H 7/22; E04H 2007/225

USPC ....................................................... 222/413
See application file for complete search history.

(56) References Cited

U.S. PATENT DOCUMENTS

| | | | | |
|---|---|---|---|---|
| 1,232,929 A * | 7/1917 | Keller | .................... | B65D 88/02 220/565 |
| 1,243,873 A * | 10/1917 | Poppenhusen | ......... | B65D 88/26 52/194 |
| 1,602,664 A * | 10/1926 | Hague | .................... | B65D 88/26 52/197 |
| 4,408,426 A * | 10/1983 | Ystebo | ...................... | E04H 7/30 52/245 |
| 5,836,480 A * | 11/1998 | Epp | ..................... | A01F 25/2018 222/143 |
| 6,923,340 B2 * | 8/2005 | Ambs | ................. | B65B 69/0075 222/105 |
| 7,487,892 B1 * | 2/2009 | Hirsch | .................. | G01F 13/001 222/240 |
| 2011/0058905 A1 * | 3/2011 | Hamel | .................. | B65D 88/28 406/138 |

(Continued)

*Primary Examiner* — Benjamin R Shaw
(74) *Attorney, Agent, or Firm* — Botkin & Hall, LLP

(57) ABSTRACT

An unloading system for use in a storage structure having a sidewall that contains granular stored material. A reclaiming portion is spaced from the sidewall and has a floor portion that extends from a discharge opening toward the sidewall. The floor portion of the reclaiming portion is supported above the floor of the storage structure. The reclaiming portion may move with respect to the sidewall and is isolated from movement with respect to the sidewall of the storage structure. Seals between the reclaiming portion and the sidewall prevent the stored material from bypassing the reclaiming portion so that any discharge of the stored material occurs through the discharge opening.

14 Claims, 20 Drawing Sheets

(56) References Cited

U.S. PATENT DOCUMENTS

| | | | |
|---|---|---|---|
| 2011/0163133 A1* | 7/2011 | Moretto | B65D 88/32 |
| | | | 222/460 |
| 2013/0295833 A1* | 11/2013 | Thiessen | B65D 88/28 |
| | | | 454/178 |
| 2017/0081836 A1* | 3/2017 | Thiessen | B65D 88/28 |
| 2017/0305655 A1* | 10/2017 | Vanparys | B65D 88/28 |
| 2020/0031571 A1* | 1/2020 | Rosumowitsch | B65D 88/742 |
| 2020/0115150 A1* | 4/2020 | Froese | E04H 7/30 |

\* cited by examiner

INDEPENDENT FLOOR STORAGE SYSTEM

BACKGROUND OF THE INVENTION

Auger systems have been commonly used to move material from a silo or other storage structure. The stored material is often a flowable or semi-flowable solid material and is often granular in nature. Traditionally, bottom unloading auger systems have an auger that is located on the floor of the storage structure and is covered with stored material. To convey material from the storage structure the auger rotates about its linear axis to convey material along its flights from one of its ends toward a secondary conveying device. While the auger rotates about its linear axis it is also advanced through the stored material. There are two ways that bottom unloading auger systems advance the auger through the stored material:

1) Augers may rotate in a circular fashion through the stored material, conveying stored material to a discharge opening that is centrally located, then the material that flows though the discharge opening is fed into a secondary conveyor as shown in FIG. 1.

2) Augers may move in a linear fashion through the stored material, conveying the stored material to a discharge opening, then into a secondary conveyor as shown in FIG. 9.

The stored material exerts both static loads from the constant pressure of the material as well as dynamic loads as the auger conveys the material from the bottom of the storage structure. During use of the auger, voids may develop where stored material has been conveyed and that introduces asymmetric dynamic loads. These loads may not be predictable. There are many variables that dictate how flowable or semi-flowable solids in granular form may behave. Variables such as humidity, particle size, and compaction of the stored material affect how it will flow. At times, material may cake together, then suddenly cleave, and this can impart significant and unpredictable dynamic loads within the storage structure. Due to the unpredictable nature of loading, a designer of the storage structure employing a bottom unloading system must design the storage structure to be robust enough to handle the worst-case dynamic loading. This results in a structure that is over designed to handle loads it will rarely see. This has also meant that a designer of bottom unloading auger systems must necessarily design an auger system as an integrated package with a structure built together with the unloading system. As such, it is sometimes not possible to retrofit a bottom unloading auger system into an existing storage structure because sufficient reinforcement of an existing storage structure may not be possible or is cost prohibitive.

SUMMARY OF THE INVENTION

The present invention is an unloading system for use in a storage structure for containing stored material. The storage structure has a floor and a sidewall. A reclaiming portion is spaced from the sidewall of the storage structure. The reclaiming portion has a floor portion that extends from a discharge opening toward the sidewall of the storage structure. The floor portion of the reclaiming portion is supported above the floor of the storage structure. A lower support bracket is affixed to the sidewall of the storage structure and the lower support bracket has a horizontal leg with an upper surface and a vertical leg. An upper support bracket is affixed to the floor portion and has a horizontal leg with a lower surface and the vertical leg has an outer surface. A lower seal is located between the horizontal leg of the lower support bracket and the horizontal leg of the upper support bracket. The lower seal has a height that is greater than the distance between the upper surface of the horizontal leg of the lower support bracket and the lower surface of the horizontal leg of the upper support bracket.

DETAILED DESCRIPTION OF INVENTION

Figure 1:
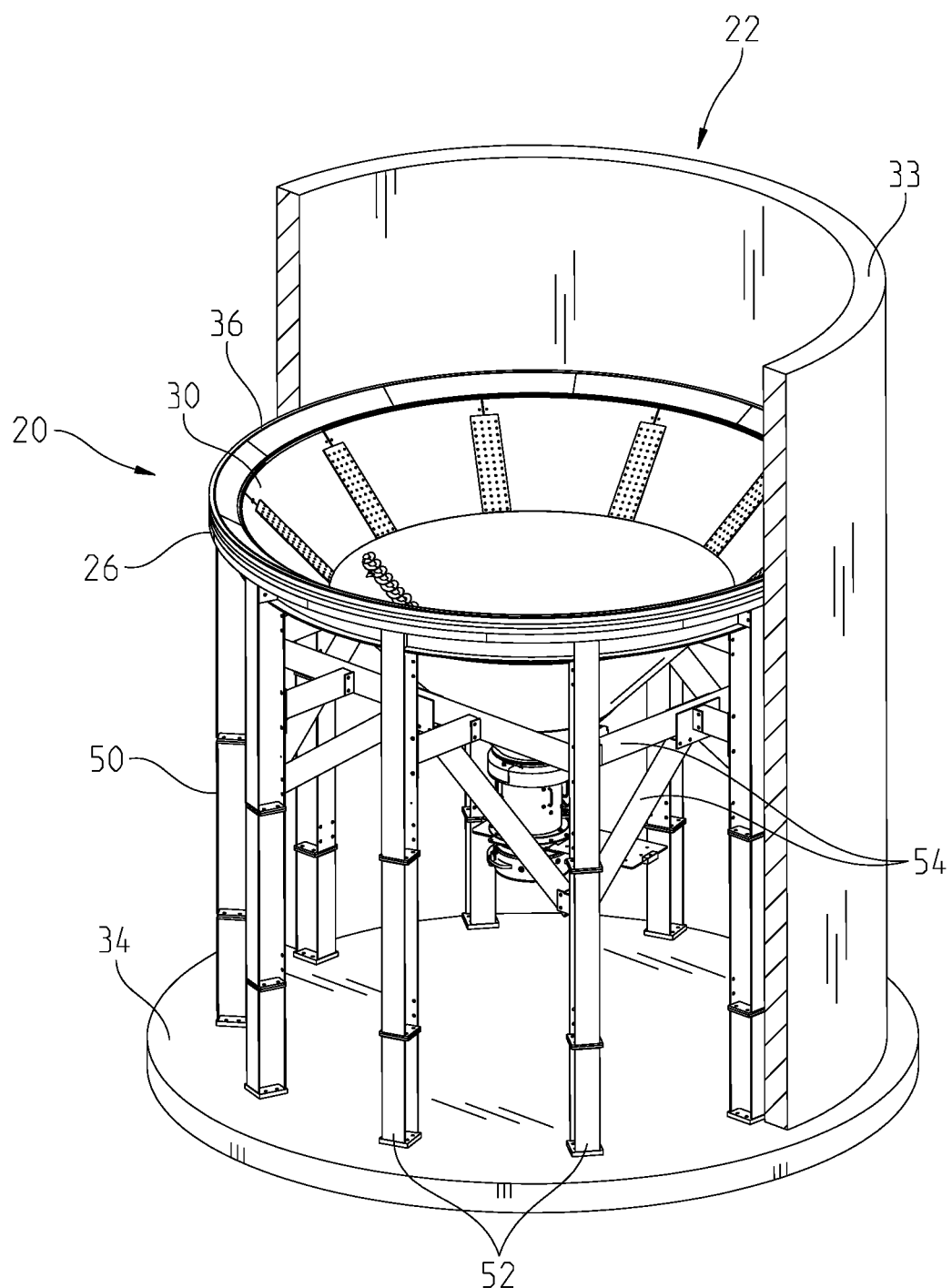
FIG. 1 is a perspective view of a storage structure (silo) that is cut away to show the unloading system of the present invention.
Figure 2:
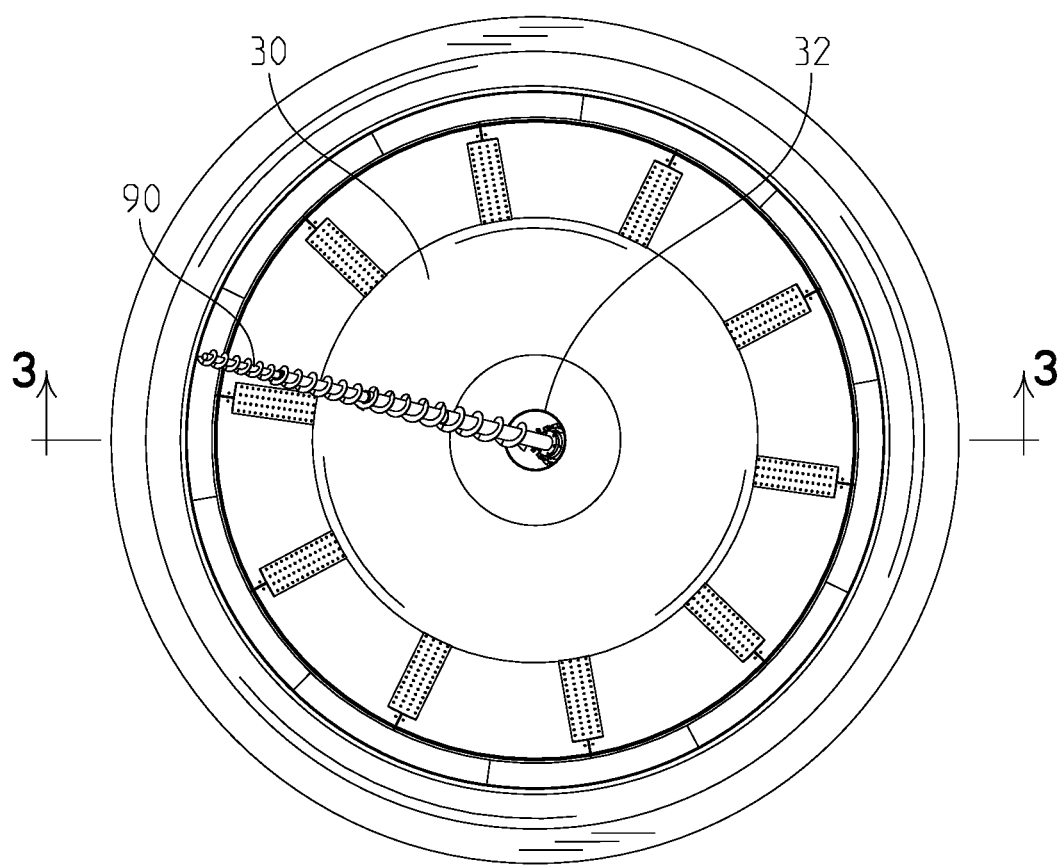
FIG. 2 is a top view of the unloading system shown in FIG. 1.
Figure 3:
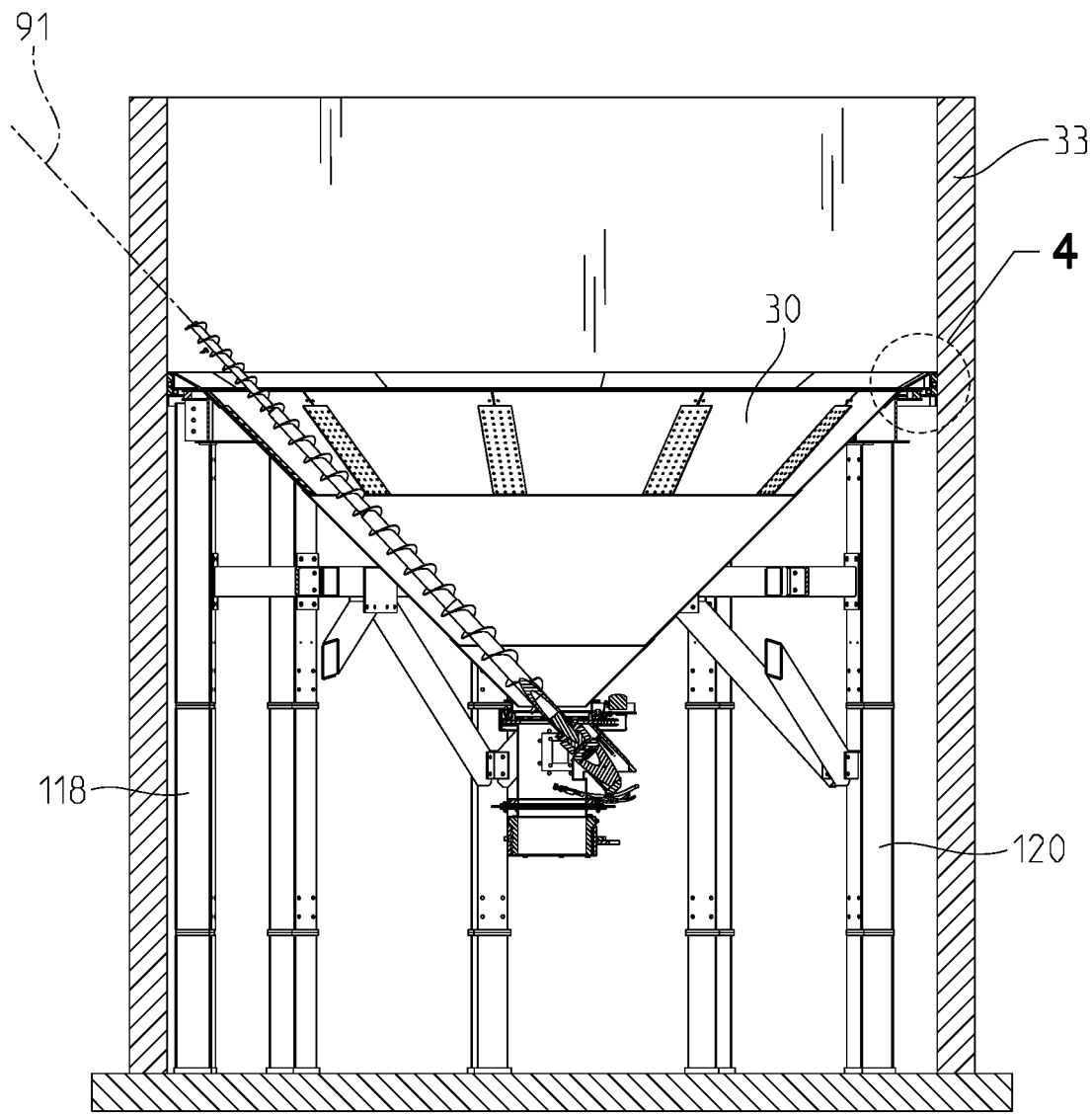
FIG. 3 is a sectional view of the unloading system taken about line 3-3 in FIG. 2.
Figure 4:
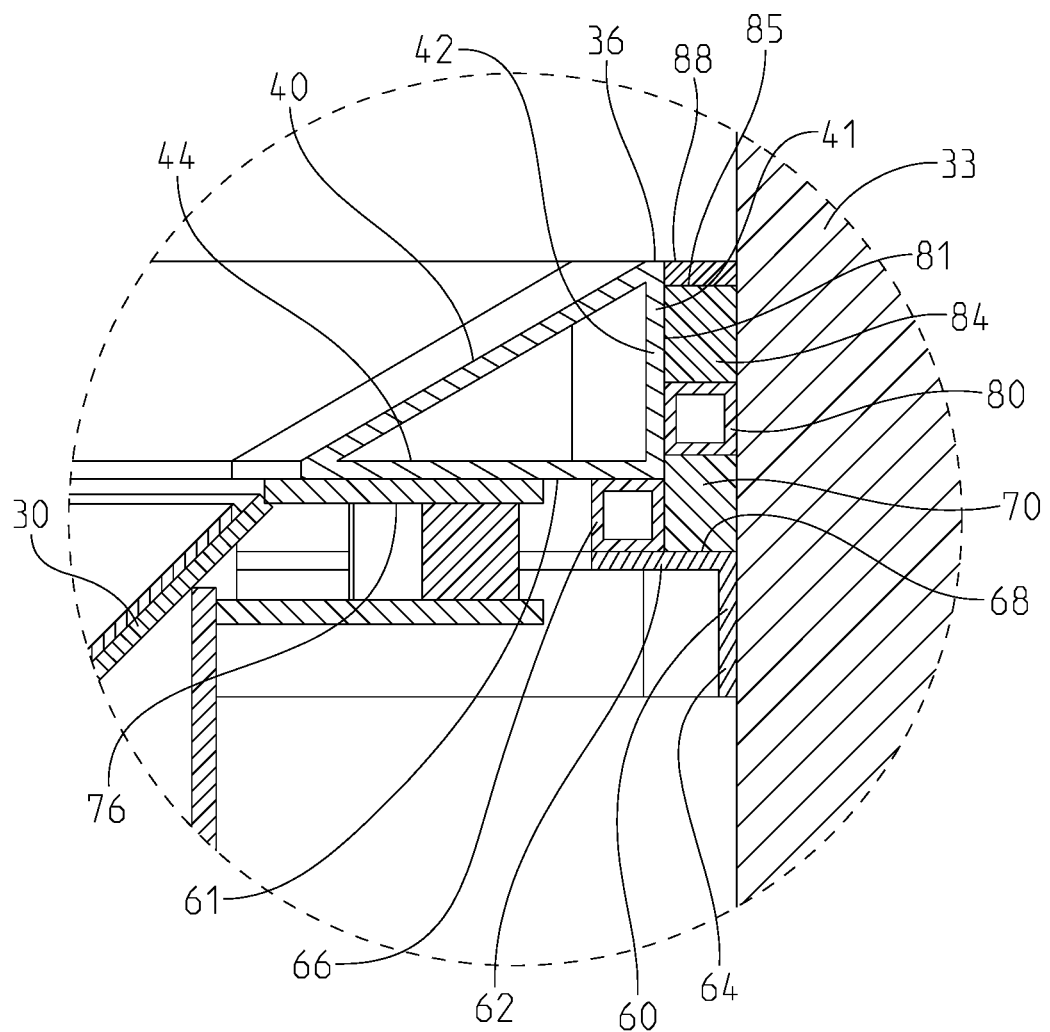
FIG. 4 is a magnified view showing the detail in area 4 in FIG. 3.
Figure 5:
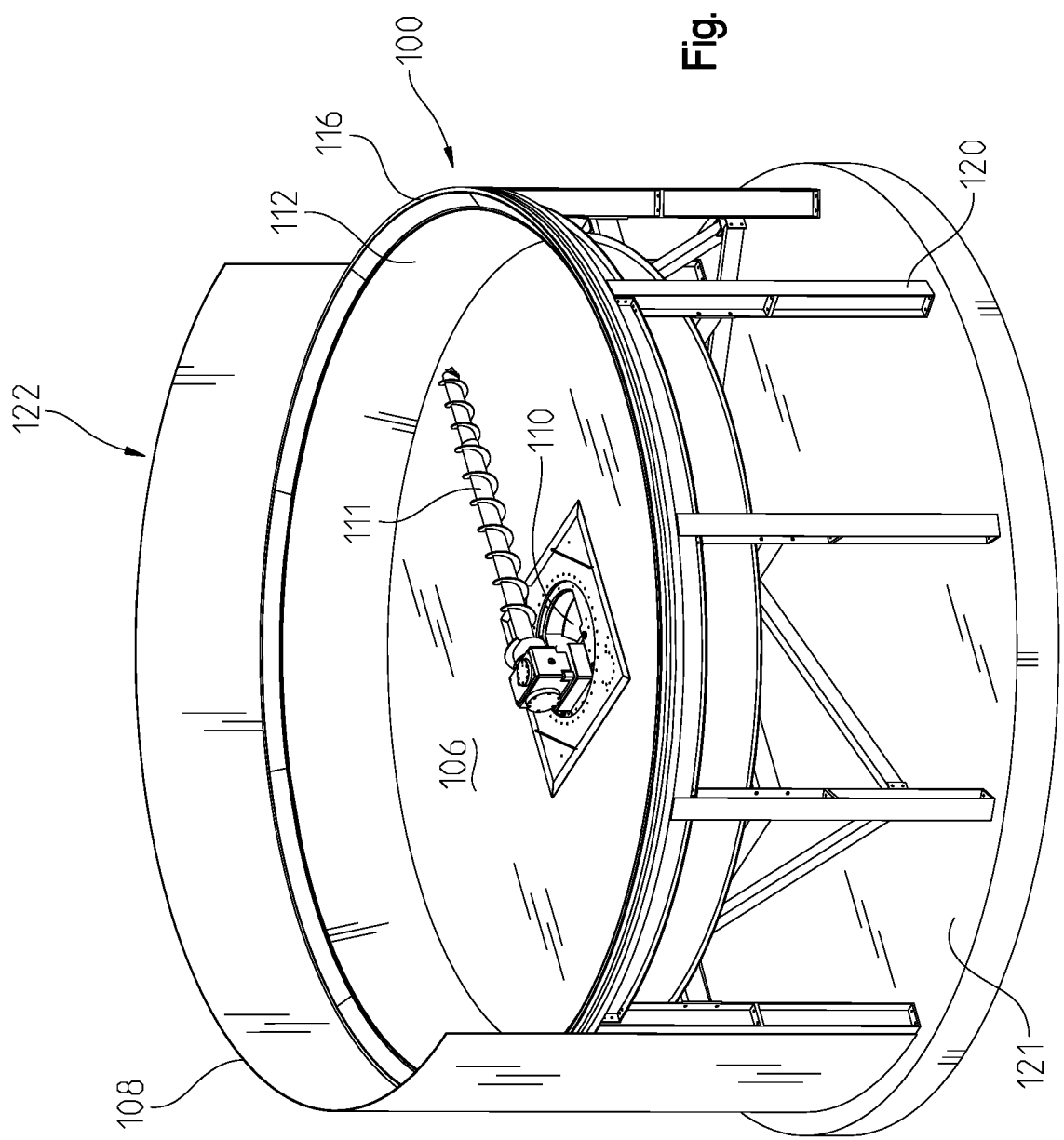
FIG. 5 is a perspective view of a storage structure (silo) that is cut away to show an unloading system having a generally flat floor.
Figure 6:
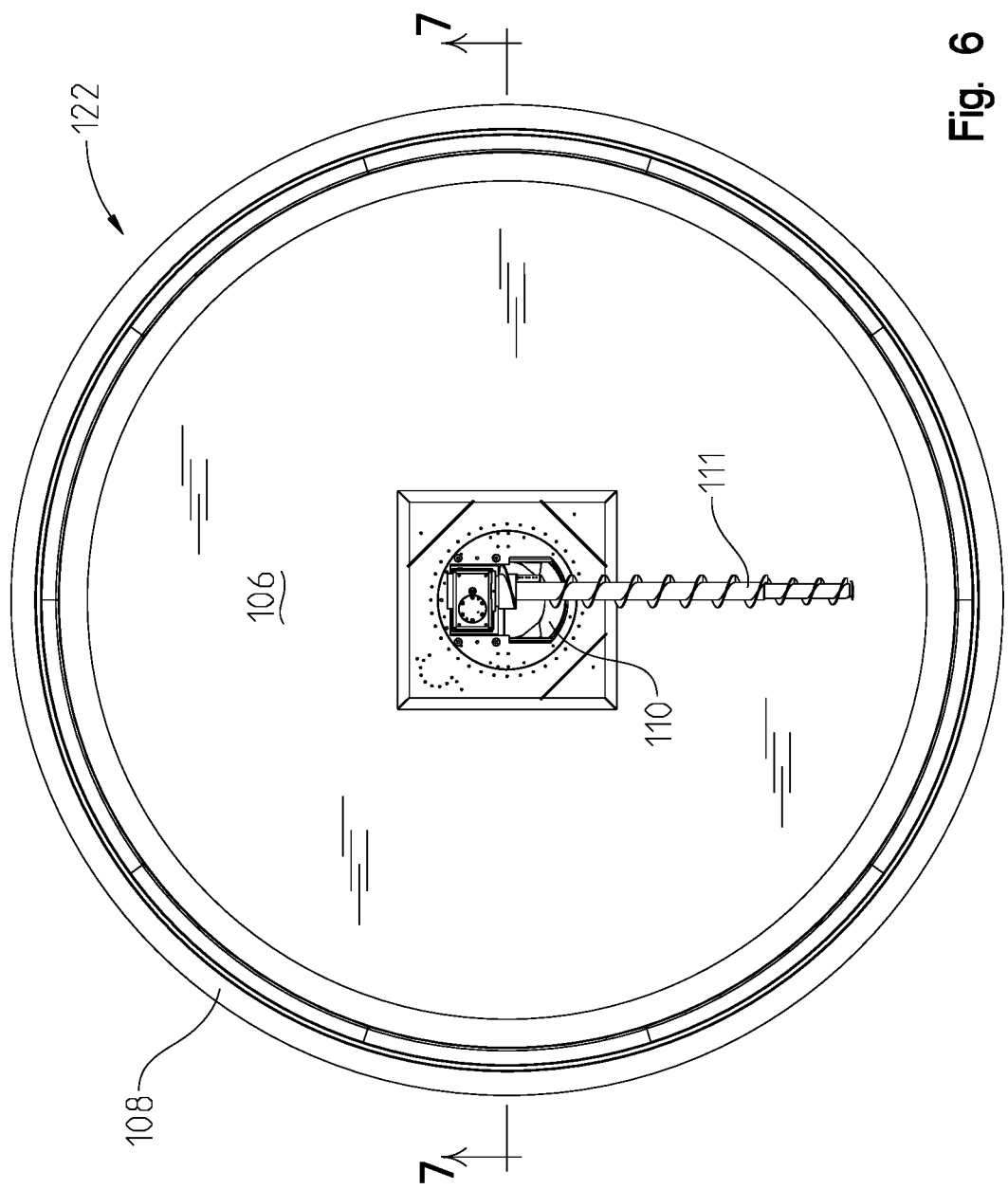
FIG. 6 is a top view of the unloading system shown in FIG. 5.
Figure 7:
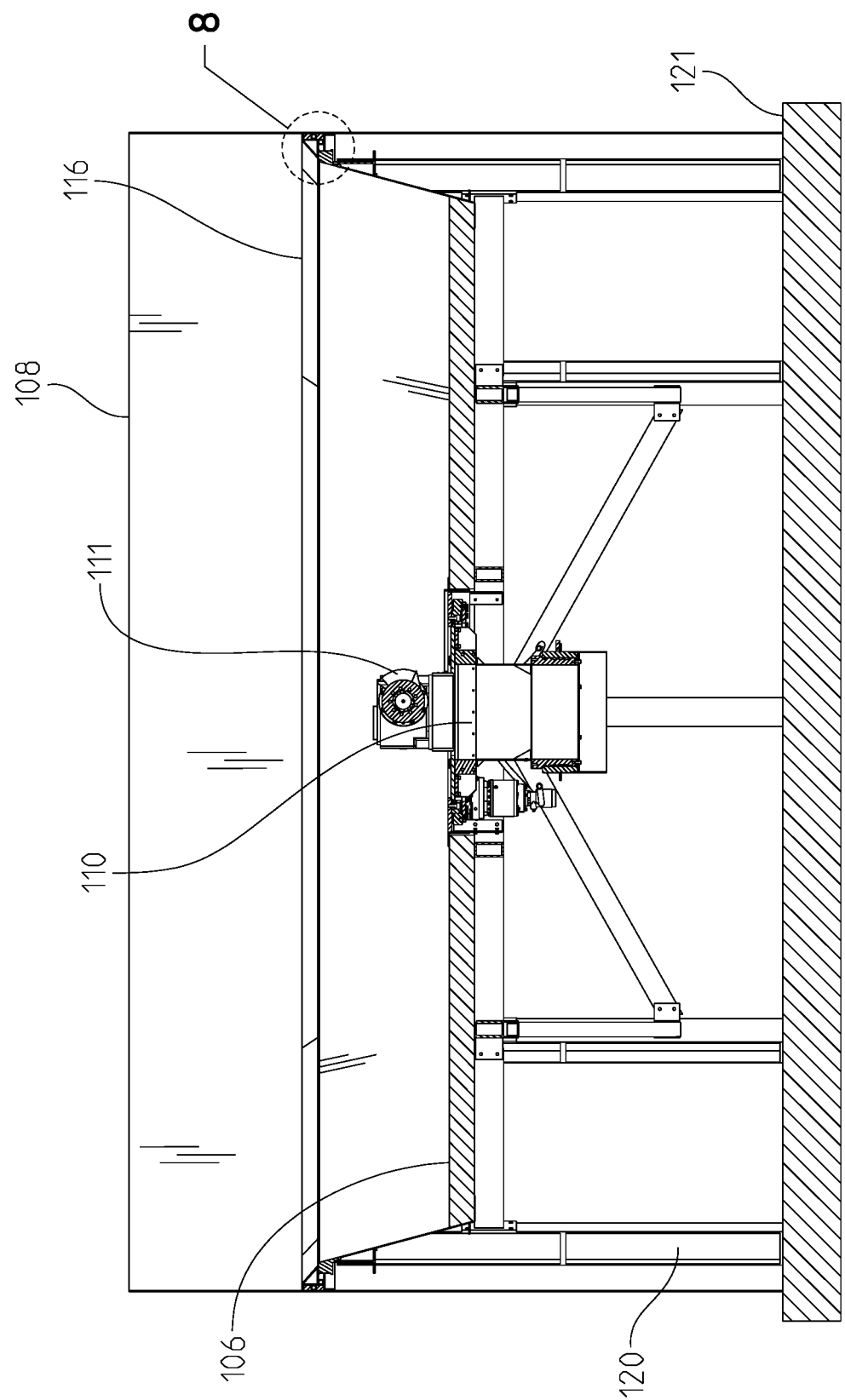
FIG. 7 is a sectional view taken about line 7-7 in FIG. 6.

FIG. 1 shows a sectional view of the unloading system 20 of the present invention. The unloading system 20 is a bottom unloading system that is contained in a storage structure 22, which as shown in FIG. 1 is a silo. The storage structure 22 in FIG. 1 happens to be a cylindrical structure with a sidewall 33 and a floor 34, but the present invention is not limited to cylindrical structures. The storage structure 22 may be a pre-existing structure in which the unloading system 20 is subsequently installed. The unloading system 20 has a reclaiming portion 26 that has a floor portion 30. The floor portion 30 forms a cone. The reclaiming portion 26 has a discharge opening 32 that is at the bottom of the floor portion 30 and the floor portion 30 extends outwardly from the discharge opening 32 toward the sidewall 33. The floor portion 30 terminates at its uppermost edge at an upper retaining edge 36. FIG. 4 shows the detail of the upper retaining edge 36 of the unloading system shown in FIG. 1. The upper retaining edge 36 is located where an angled top plate 40 joins an upper support bracket 41. It is contemplated that the floor portion 30 may be a unitary structure that ends directly at the upper retaining edge 36. The angled top plate 40 welded to and supported by the upper support bracket 41 has a vertical leg 42 and a horizontal leg 44. The vertical leg 42 is substantially parallel to the sidewall 33 of the storage structure 22. The angled top plate 40 that meets the upper retaining edge 36 is affixed to the upper support bracket 41 such that the angled top plate 40 and upper retaining edge 36 are substantially rigid with respect to the floor portion 30 of the reclaiming portion 26. That connection may be done with rivets, bolts, welding, or any means that provides a substantially rigid connection. That substantially rigid connection between the angled top plate 40 and the floor portion 30 only allows movement that would arise through deflection of the materials making up the angled top plate 40 and the floor portion 30 as forces are imparted to one or both. The reclaiming portion 26 is supported by a frame 50 that includes legs 52 that contact the floor 34 of the storage structure. The legs 52 are joined to cross members 54 that provide rigidity to the reclaiming portion 26 and also stabilize the legs 52. Thus, it is possible for the reclaiming portion 26 and the upper retaining edge 36 to move with respect to the sidewall 33 when deflections occur in portions of the reclaiming portion 26. Such movement of the reclaiming potion 26 may be for numerous reasons during loading and unloading. Some reasons the reclaiming portion 26 may move slightly with respect to the storage structure 22 are deflections due to a change in the amount of material stored upon the floor portion 30, asymmetric loading of the storage structure 22 that imparts variable loading on the floor portion 30, sudden shifting of the stored material as it moves through the storage structure 22, or the dynamic loads that result from the auger movement and associated localized displacement of stored material. In addition to movement of the floor portion 30, the storage structure 22 itself may move.

During installation of the unloading system into a pre-existing silo, as a first step, the frame 50 and floor portion 30 are installed within the storage structure 22, as shown in FIG. 1. Then, a lower support bracket 60 is installed onto the sidewall 33 of the storage structure 22, as shown in FIG. 4. The lower support bracket 60 has a horizontal leg 62 and a vertical leg 64. The vertical leg 64 is affixed to the sidewall 33 by any means that will provide a rigid connection to the sidewall 33. After the lower support bracket 60 is affixed to the sidewall 33, a lower seal 66 is installed on an upper surface 68 of the horizontal leg 62 of the lower support bracket 60. The lower seal 66 is an EPDM (ethylene propylene diene monomer) hollow seal that is readily deformable. The upper support bracket 41 is installed onto the floor portion 30 above the lower seal 66 so that it contacts the lower seal 66 opposite the lower support bracket 60. The distance between lower surface 61 of the horizontal leg 44 and upper surface 68 is less than the height of the lower seal 66. As such the lower seal 66 remains in biased contact between the upper support bracket 41 and lower support bracket 60. This interference fit of the lower seal 66 with both brackets provides a seal between the upper support bracket 41 and lower support bracket 60, yet allows relative movement between the upper and lower support brackets 41, 60. Depending on the application, the lower seal 66 may be compressed more between the upper and lower support brackets 41, 60 and the compression of the lower seal 66 is set such that no movement of the reclaiming portion 26 will cause separation of the lower seal 66 from the upper and lower support brackets 41, 60.

The upper support bracket 41 is then bolted to the upper frame member 76, which is an integral part of floor 30. The angled top plate 40 may then be welded to the upper support bracket 41 and to the upper frame member 76. A lower foam spacer 70 is installed onto the lower support bracket 60 adjacent to the lower seal 66. A portion of the lower foam spacer 70 is located between the sidewall 33 and the vertical leg 42 of the upper support bracket 41. The lower foam spacer 70 is closed cell foam. Once the lower foam spacer 70 is placed, it is caulked to fill any gaps between the upper support bracket 41 and the sidewall 33. The lower foam spacer 70 acts as a location upon which an upper seal 80 may rest. The upper seal 80 is installed between the vertical leg 42 of the upper bracket 41 and the sidewall 33 as shown in FIG. 4. In this way, no part of the upper seal 80 contacts the lower seal 66. Much like the lower seal 66, the upper seal 80 is an EPDM hollow seal that is readily deformable. The outer surface 81 of the vertical leg 42 of the upper support bracket 41 is spaced from the sidewall 33 a distance less than the width of the upper seal 80. This puts the upper seal 80 in biased contact between the upper support bracket 41 and the sidewall 33 so that it forms a tight seal between the upper support bracket 41 and the sidewall 33. The interference fit of the upper seal 80 between the upper bracket 41 and sidewall 33 is chosen so that under no conditions of movement does the upper bracket 41 or sidewall 33 lose contact with the upper seal 80. It is contemplated in some instances, the outer surface 81 may be directly on the floor portion 30 in cases where no upper support bracket 41 is used. Because the upper seal 80 and lower seal 66 do not contact each other, they are free to deform independently of each other during movement of the reclaiming portion 26 with respect to the storage structure 22.

An upper foam spacer 84 is installed on top of the upper seal 80 so that it extends to a location slightly below the upper retaining edge 36. The upper foam spacer 84 may be caulked along its upper surface 85 where it meets the sidewall 33 and vertical leg 42 of the upper support bracket 41 to prevent any material from bypassing the upper foam spacer 84. The sidewall 33 may be irregular or rough in texture and the application of caulk to the upper foam spacer 84 provides additional sealing in addition to the upper foam spacer 84 conforming to the sidewall 33. The remaining space between the upper retaining edge 36 and sidewall 33 above the upper seal 80 is filled with a flexible crack sealant 88. The crack sealant 88 fills any irregularities and raises the height to that of the upper retaining edge 36 or slightly above it.

The unloading system 20 as shown in FIG. 1 includes an auger 90 that rotates about its linear axis 91 through its center as well as rotates with respect to the discharge opening 32. Through both of these modes of rotation, the auger 90 moves stored material toward the discharge opening 32. The discharge opening 32 is connected to a gravity fed chute that drops the stored material onto a secondary conveyor which in turn moves the stored material to a location outside of the storage structure 22. As the auger 90 is used, the asymmetric dynamic forces on the floor that arise during unloading will be taken by the reclaiming portion 26 and through the frame 50 and its legs 52. This may cause slight movement of the reclaiming portion 26 due to deflection in the frame 50 supporting the floor portion 30.

Figure 8:
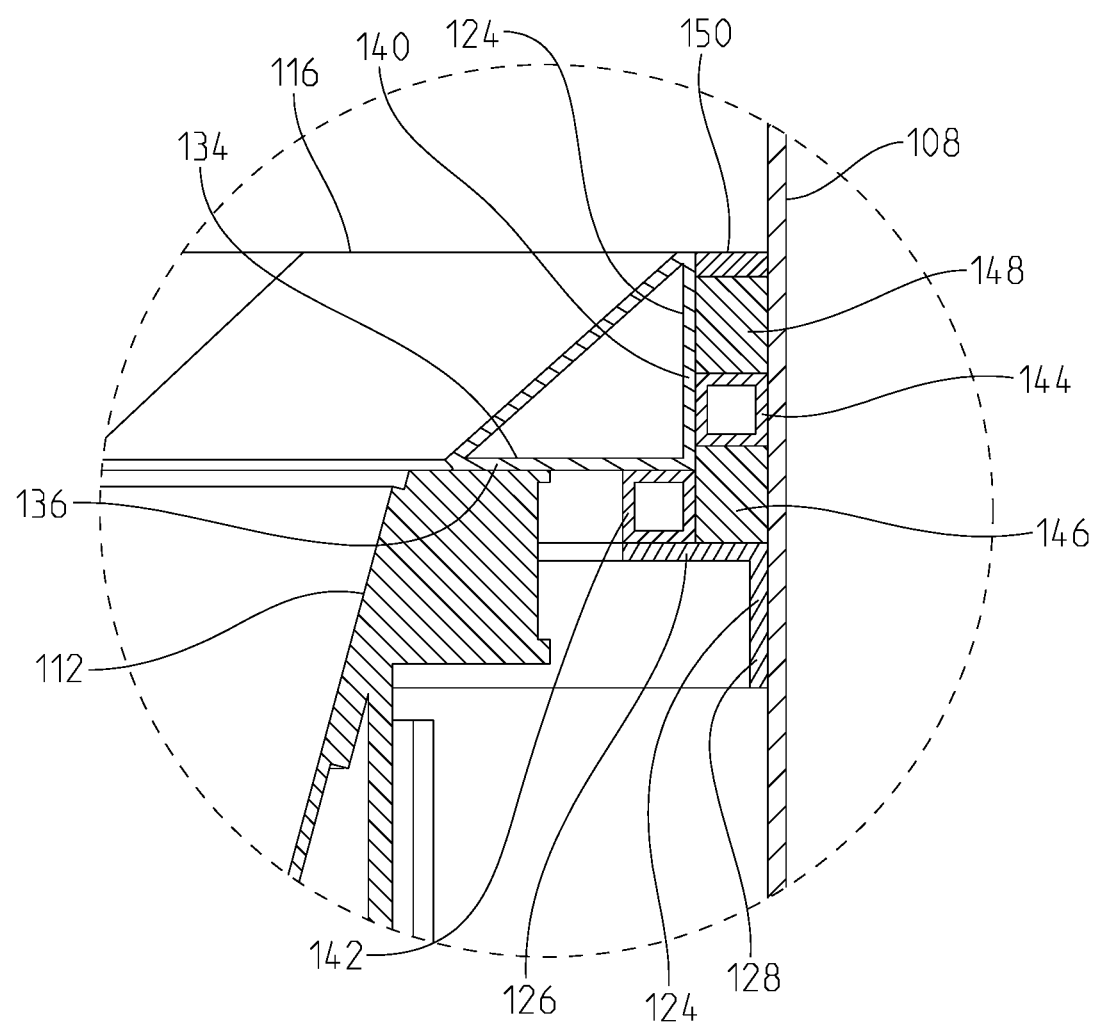
FIG. 8 is a magnified view showing the detail in area 8 in FIG. 7.
Figure 9:
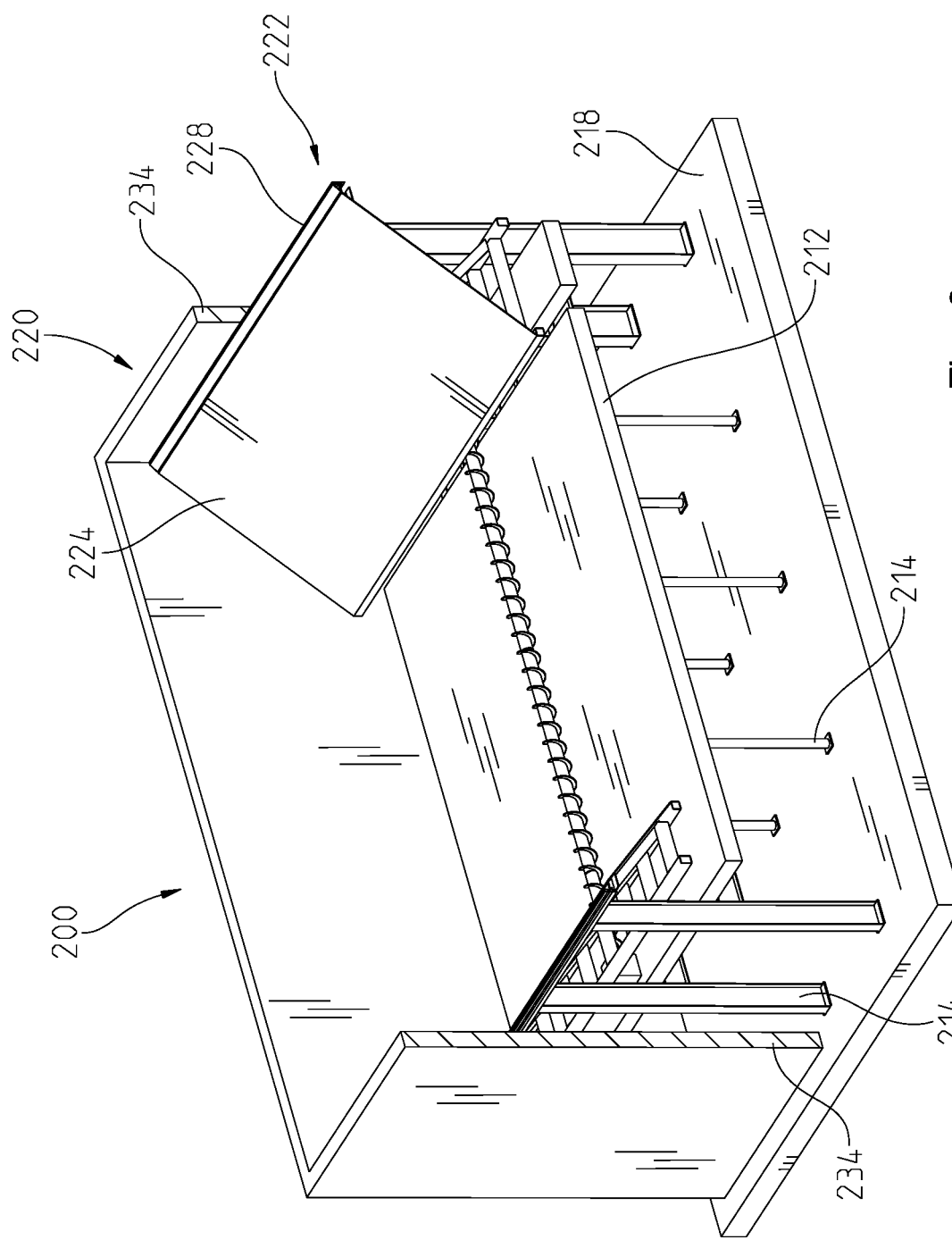
FIG. 9 is a perspective view of a storage structure that is cut away to show an unloading system that has an auger that moves laterally.
Figure 10:
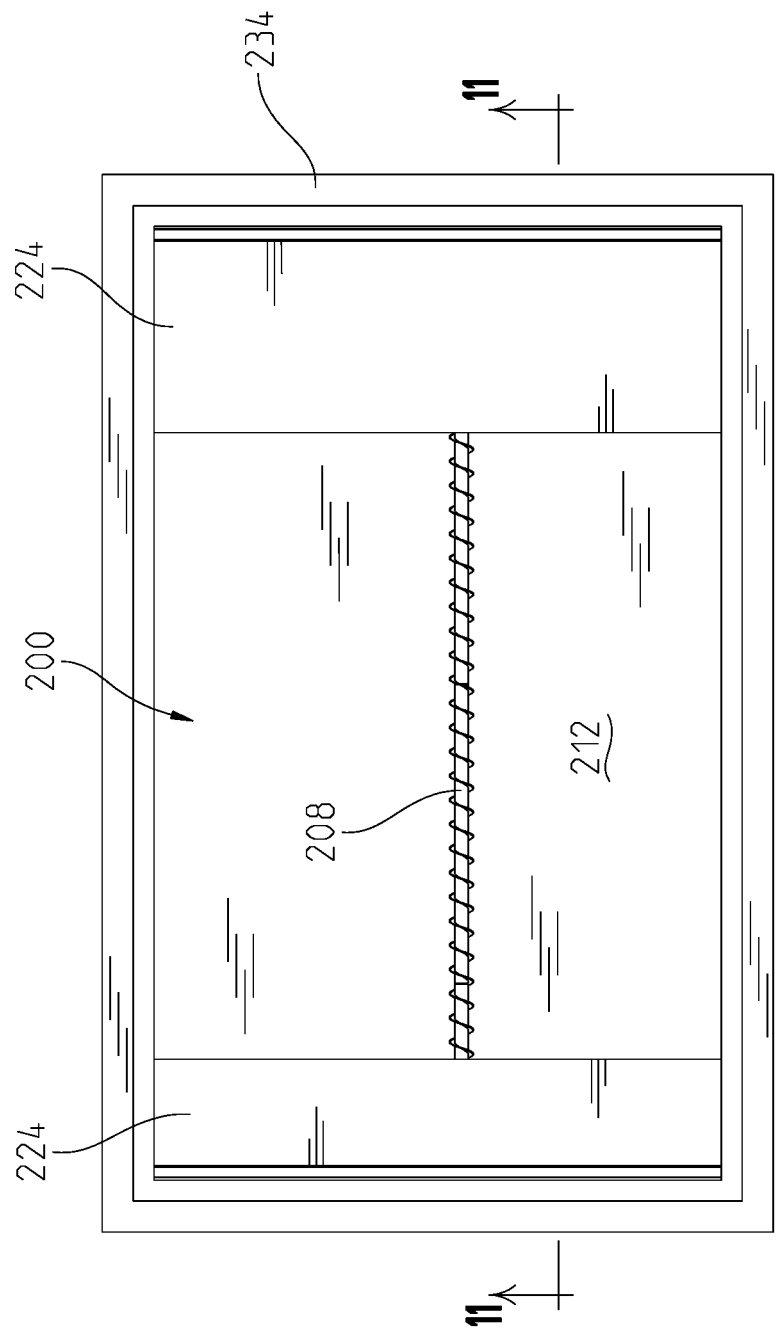
FIG. 10 is a top view of the unloading system shown in FIG. 9.
Figure 11:
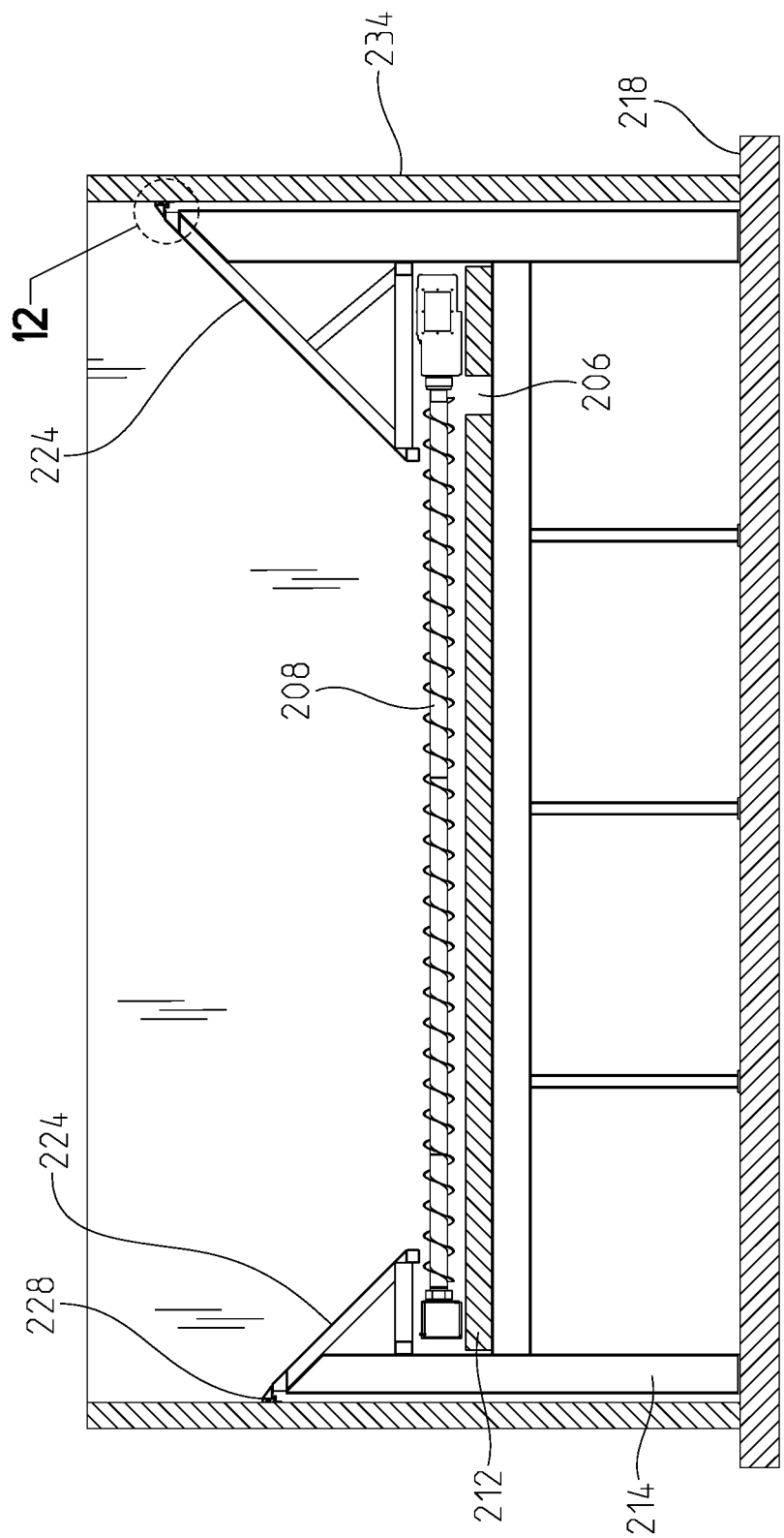
FIG. 11 is a sectional view taken about the line 11-11 in FIG. 10.

As such, the floor portion 30 and upper support bracket 41 may move with respect to the sidewall 33. Some of that movement of the floor portion 30 may be vertical and some of the movement may be lateral. Vertical movement will predominately deform the lower seal 66 and lateral movement will predominately deform the upper seal 80. The upper and lower seals 80, 66 are of sufficient flexibility that they provide a seal between the storage structure and the reclaiming portion 26 throughout the full range of movement of the reclaiming portion with respect to the storage structure 22. The seal between the reclaiming portion 26 of the unloading system 20 is maintained with the storage structure 22 sidewall 33 because the lower seal 66 is sufficiently resilient to remain in contact with both the lower support bracket 60 and the upper support bracket 41. The upper seal 80 is sufficiently resilient to maintain contact between the sidewall 33 and the vertical leg 42 of the upper support bracket 41. In this manner, the unloading system 20 and its reclaiming portion 26 remain isolated from the sidewall 33 of the storage structure 22, yet sealed with respect to the sidewall 33. Movement of the reclaiming portion 26 is substantially independent of the sidewall 33. This is because the reclaiming portion 26 is spaced from the sidewall 33 of the storage structure 22 and no part of the reclaiming portion contacts the walls of the storage structure 22 except via the flexible seal as described above. Therefore, forces that may occur with shifting of stored material in the reclaiming portion 26 are not transmitted to the sidewall 33 of the storage structure 22. This enables the unloading system 20 of the present invention to be installed within an existing storage structure 22 without additional reinforcement of the storage structure 22, provided the storage structure is capable of withstanding the material loads exerted on the silo walls above the floor system Much like the unloading system shown in FIGS. 1-4, it is possible to have a reclaiming portion 100 that has a nearly flat floor portion 106 that extends outwardly toward a sidewall 108 from a discharge opening 110. Auger 111 conveys material into the discharge opening 110. In this case, a stem wall 112 extends upwardly from the floor portion 106 to an upper retaining edge 116. The height of the stem wall 112 is chosen so that forces within the stored material generated as it shifts during unloading are not imparted to the sidewall 108. The frame 118 includes legs 120 that support the floor portion 106 above the floor 121 of the storage structure 122. As shown in FIG. 8, a lower support bracket 124 is joined to the sidewall 108. The lower support bracket 124 has a horizontal leg 126 and a vertical leg 128. An upper support bracket 134 is joined to the stem wall 112. The upper support bracket 134 has a horizontal leg 136 and a vertical leg 140. A lower seal 142 is located between the horizontal leg 126 of the lower support bracket 124 and the horizontal leg 136 of the upper support bracket. A lower foam spacer 146 contacts the lower support bracket 124 and the upper support bracket 134. The lower foam spacer 146 is located between the lower seal 142 and the sidewall 108. An upper seal 144 is located between the sidewall 108 and vertical leg 140 of the upper support bracket 134. An upper foam spacer 148 is located above the upper seal 144, and between the vertical leg 140 and sidewall 108. A flexible crack sealant 150 is applied on top of the upper foam spacer 148 to at least the level of the upper retaining edge 116. As described above, any forces that cause deflection in the frame 118 that would cause relative movement of the stem wall 112 with respect to the sidewall 108 are isolated from the sidewall 108.

Figure 12:
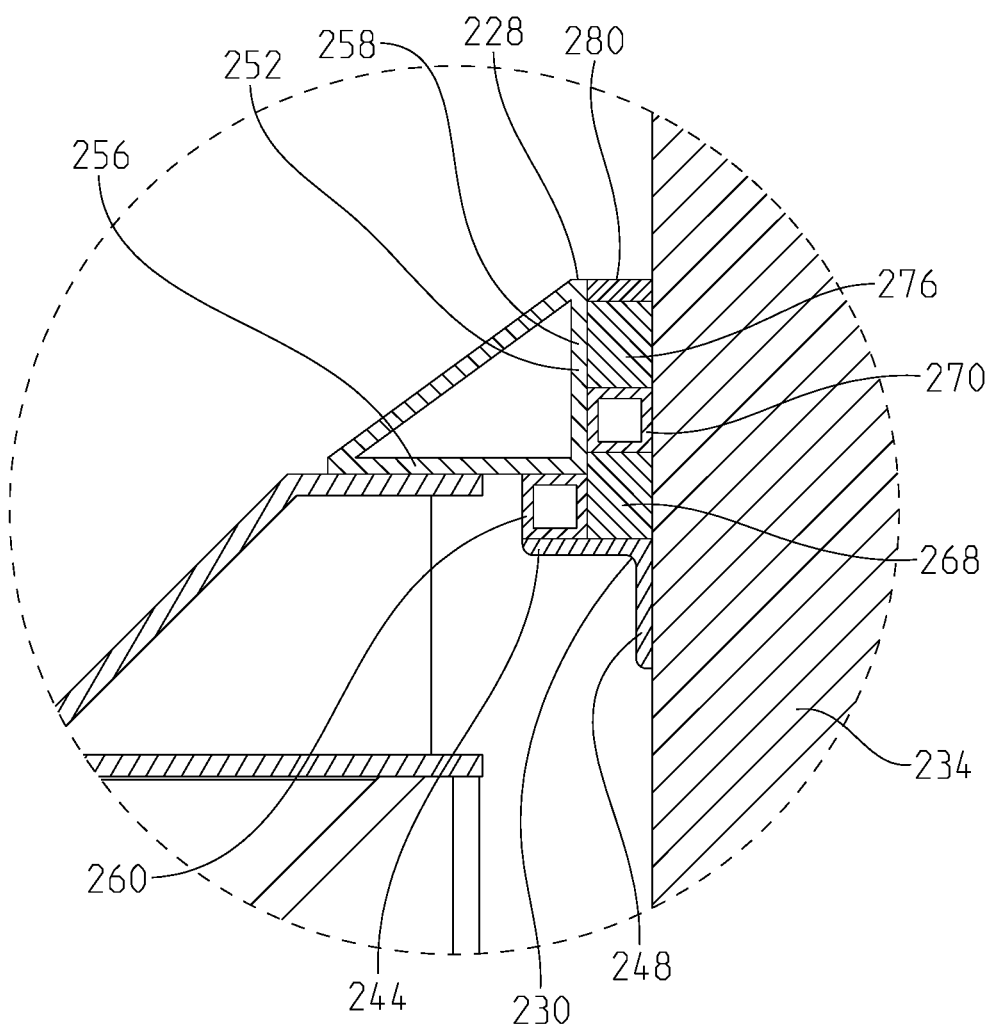
FIG. 12 is a magnified view showing the detail in area 12 in FIG. 11.

Unloading systems according to the present invention may be of the type shown in FIGS. 9-12, where the unloading system 200 contains an auger 208 which moves laterally through the stored material. The discharge opening 206 is a slot into which the auger 208 conveys material as it rotates about its linear axis and moves laterally. The auger 208 moves above a floor portion 212 that is substantially flat and is supported by frame 214 above the floor 218 of the storage structure 220. The reclaiming portion 222 includes stem walls 224 that extend upwardly to an upper retaining edge 228. In this case, the stem walls 224 act as an extension of the floor 218 and are elevated above the floor 218 to direct the flow of stored material. As shown in FIG. 12, a lower support bracket 230 is joined to sidewall 234. A lower support bracket 230 has a horizontal leg 244 and a vertical leg 248. An upper support bracket 252 is joined to the stem wall 224. The upper support bracket 252 has a horizontal leg 256 and a vertical leg 258. A lower seal 260 is located between the horizontal leg 244 of the lower support bracket 230 and the horizontal leg 256 of the upper support bracket 252. A lower foam spacer 268 contacts the lower support bracket 230 and the upper support bracket 252. The lower foam spacer 268 is located between the lower seal 260 and the sidewall 234. An upper seal 270 is located between the sidewall 234 and vertical leg 258 of the upper support bracket 252. An upper foam spacer 276 is located above the upper seal 270, and between the vertical leg 258 and sidewall 234. A flexible crack sealant 280 is applied on top of the upper foam spacer 276 to at least the level of the upper retaining edge 228. As described above, any forces that cause deflection in the frame 214 that would cause relative movement of the stem wall 224 with respect to the sidewall 234 are isolated from the sidewall 234.

Figure 13:
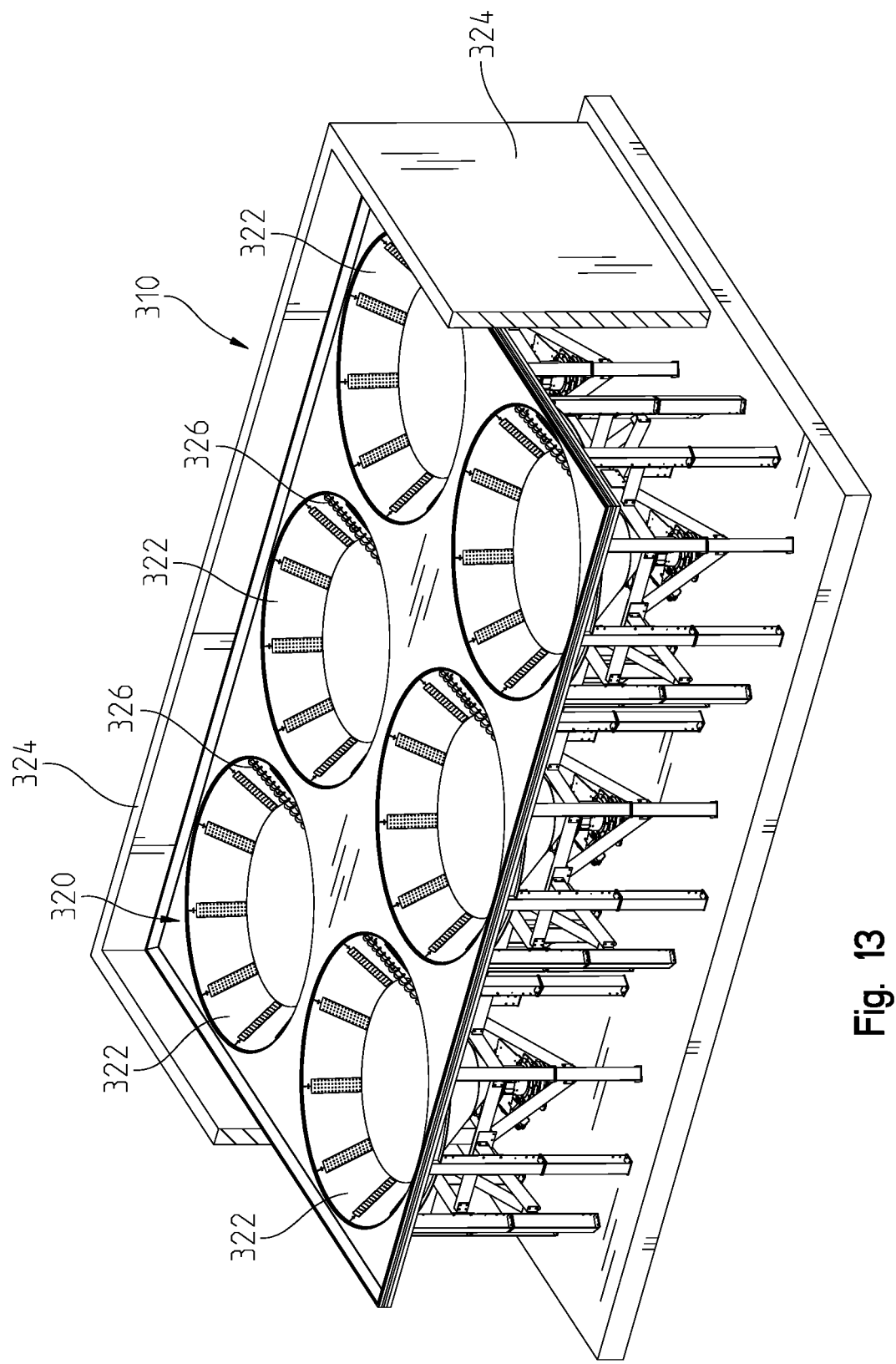
FIG. 13 is a perspective view of an unloading system with the rectangular storage structure cut away, the unloading system having multiple conical funnels.
Figure 14:
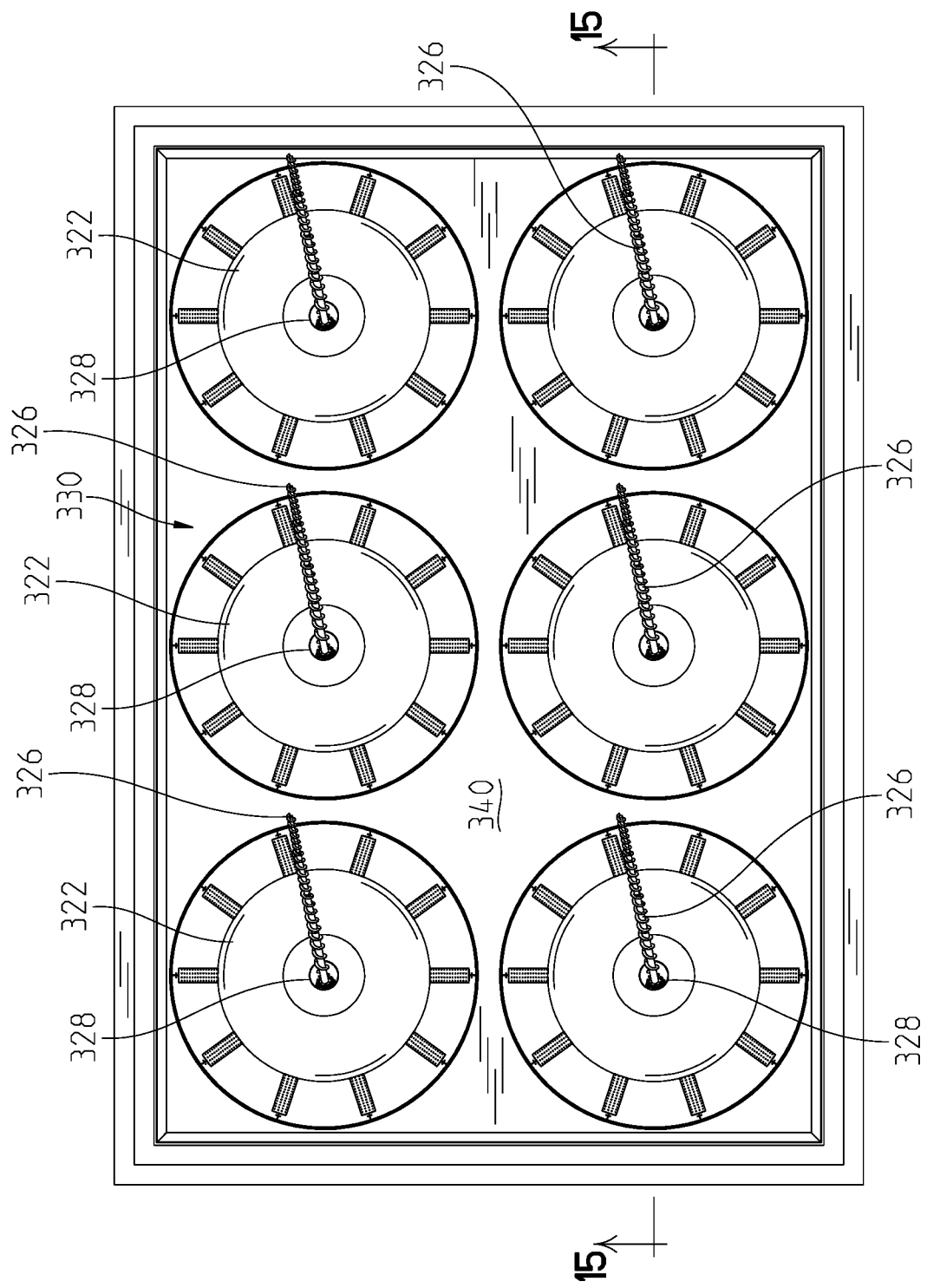
FIG. 14 is a top view of the unloading system shown in FIG. 13.
Figure 15:
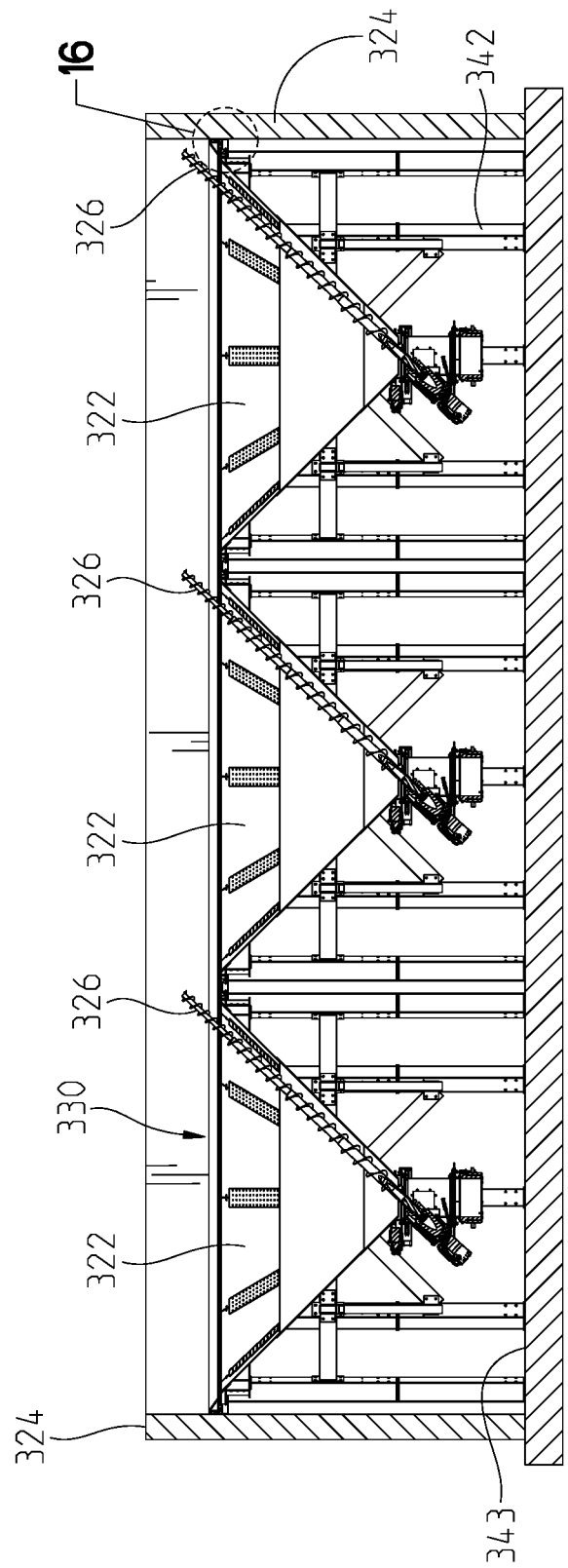
FIG. 15 is sectional view taken about line 15-15 in FIG. 14.
Figure 16:
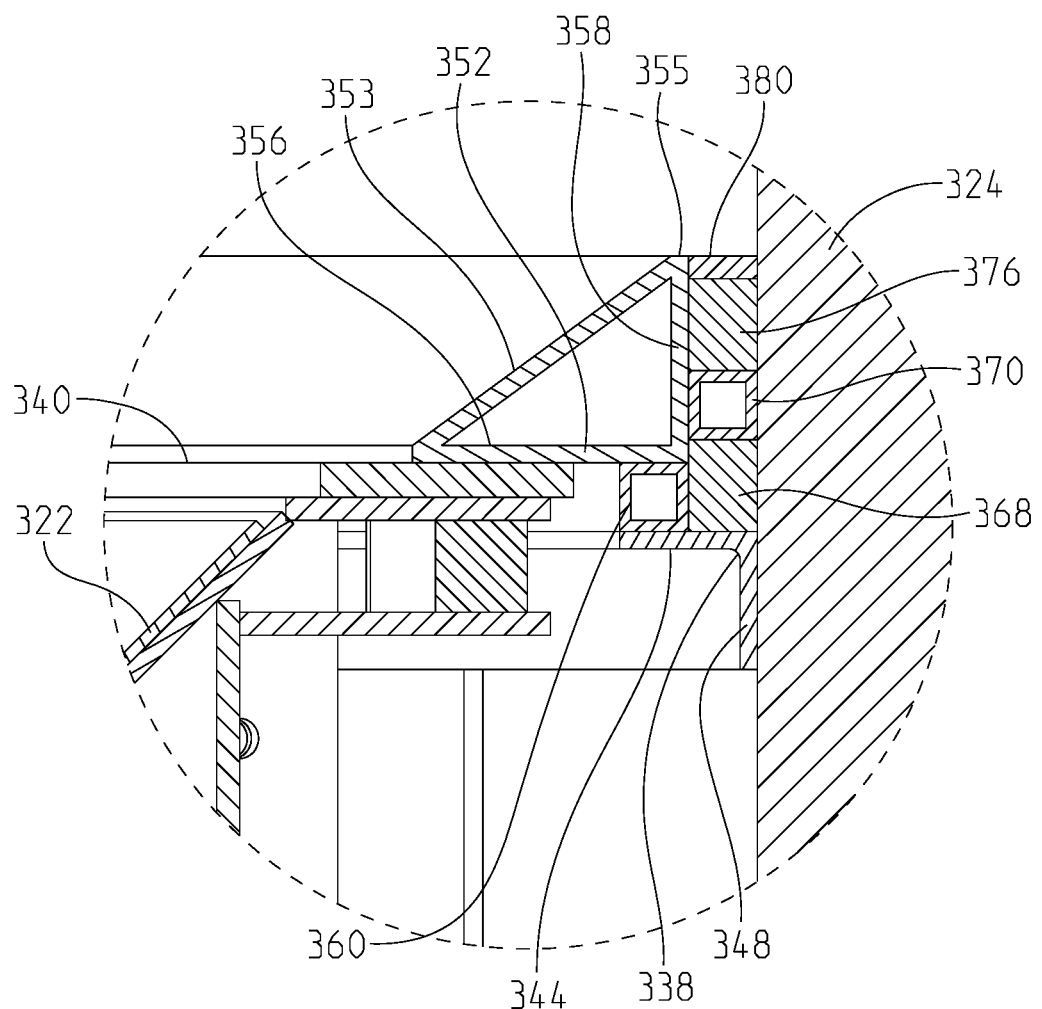
FIG. 16 is a magnified view showing the detail in area 16 shown in FIG. 15.
Figure 17:
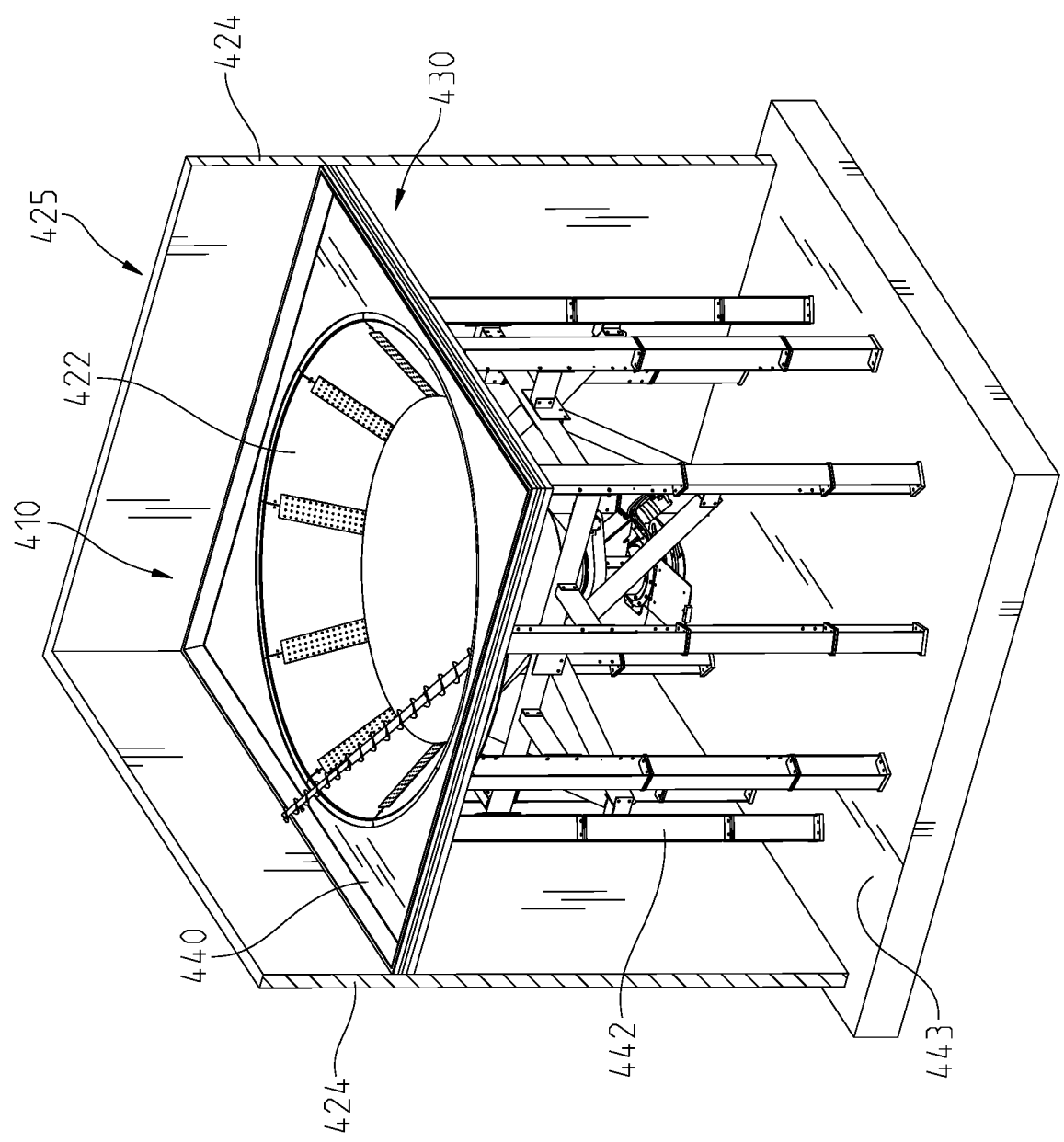
FIG. 17 is a perspective view of a rectangular storage structure having an unloading system with a conical funnel.
Figure 18:
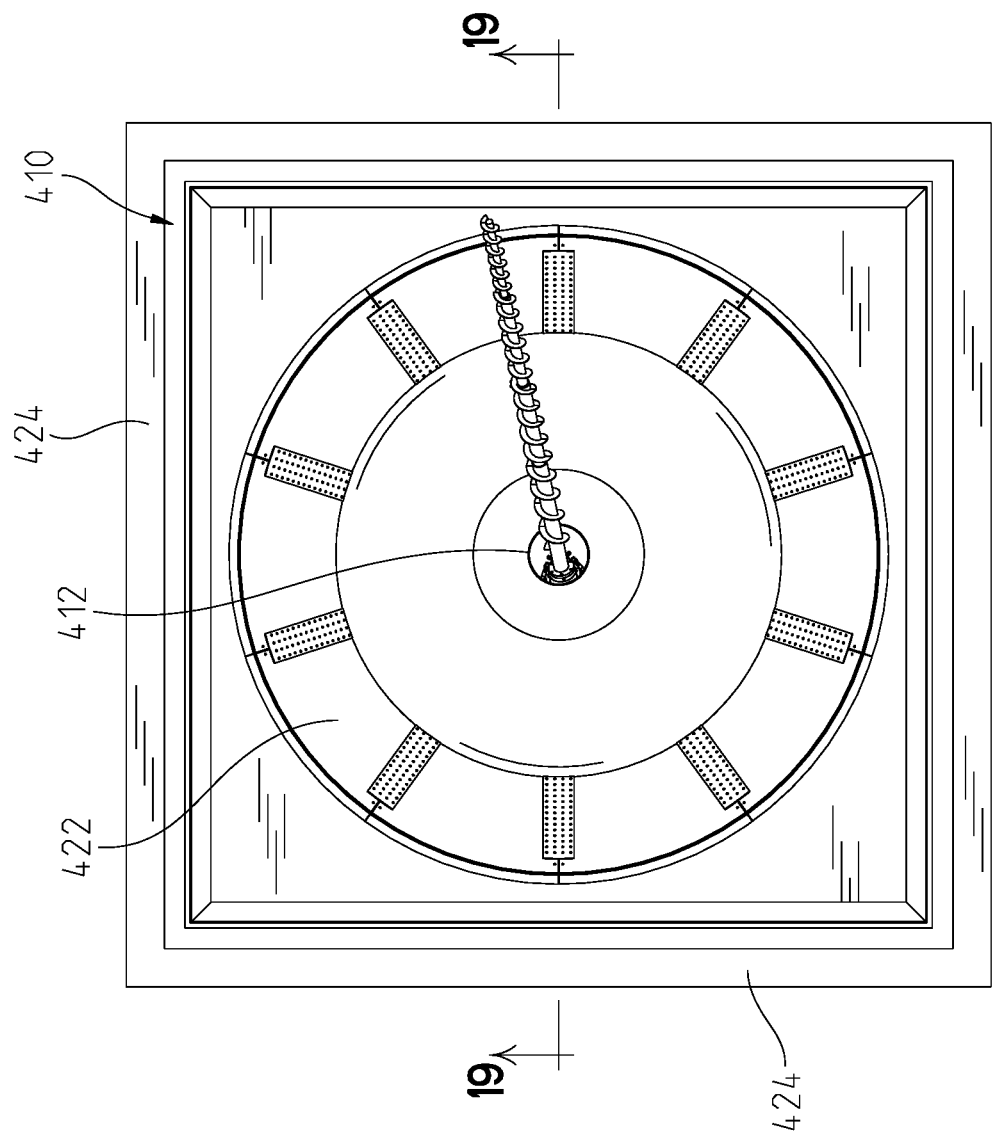
FIG. 18 is a top view of the unloading system shown in FIG. 17.
Figure 19:
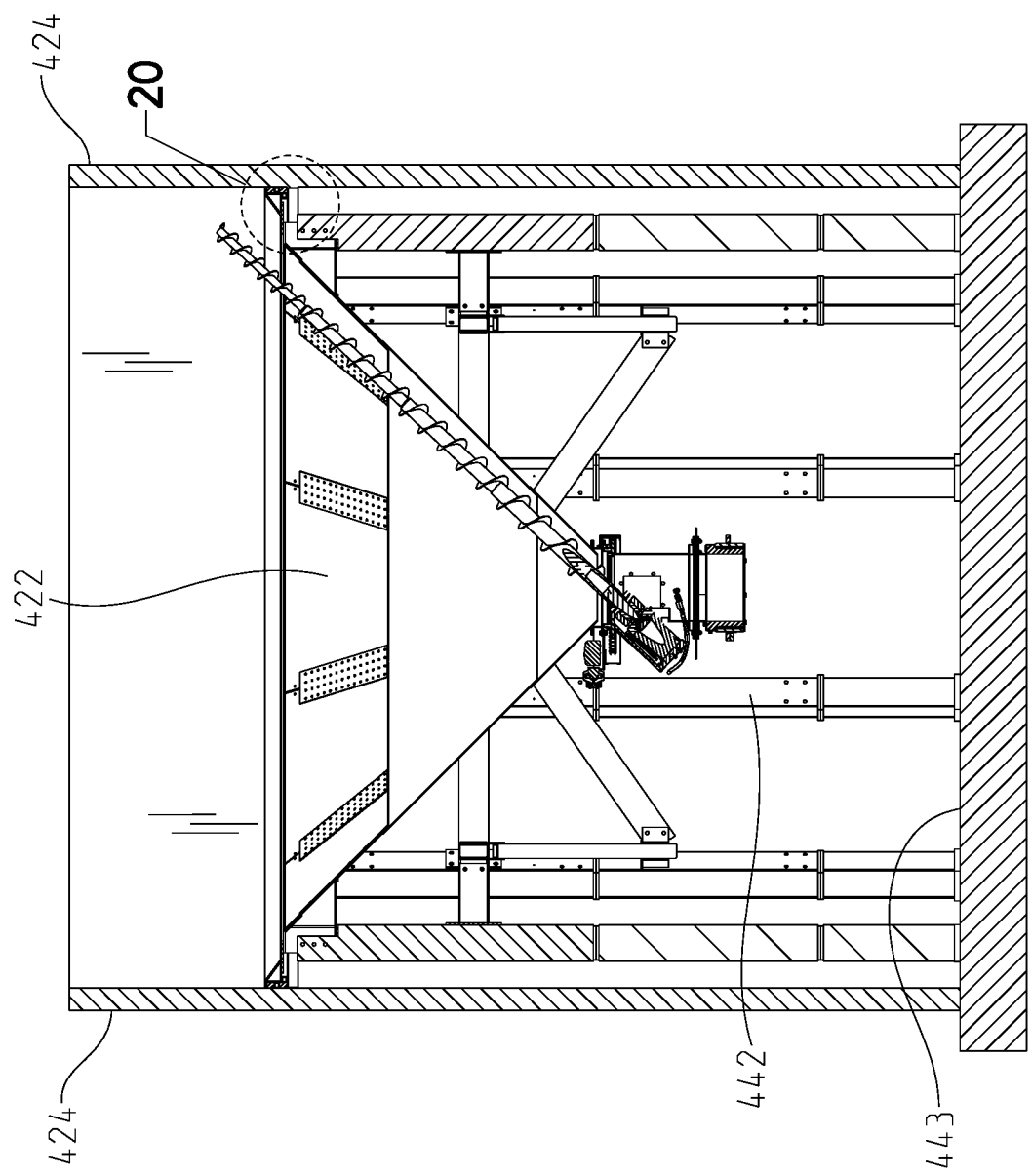
FIG. 19 is a sectional view of the unloading system taken about line 19-19 in FIG. 18.

As shown in FIG. 13, in the case of a rectangular storage structure 310 that does not use a linear unloading system like that shown in FIGS. 9-12, an unloading system 320 having multiple cone shaped floor portions 322 may be used to unload stored material from the bottom of the storage structure 310 having sidewalls 324. As shown in FIGS. 13-16, there are multiple augers 326 that move material to multiple discharge openings 328 that are centrally located within their respective floor portions 322. In this case, the reclaiming portion 330 includes the floor portions 322 which are joined to an upper platform 340 having an upper support bracket 352 joined to the upper platform 340. The reclaiming portion 330 is supported by frame 342. The frame 342 supports the reclaiming portion 330 above the floor 343 of the storage structure 310. As shown in FIG. 16, a lower support bracket 338 is joined to sidewall 334. The lower support bracket 338 has a horizontal leg 344 and a vertical leg 348. The upper support bracket 352 has a horizontal leg 356 and a vertical leg 358 and is joined to the upper platform 340. The upper support bracket 352 includes an angled top plate 353 that is welded to support bracket 352 and to the upper platform 340. The uppermost part of the reclaiming portion is the upper retaining edge 355. A lower seal 360 is located between the horizontal leg 344 of the lower support bracket 338 and the horizontal leg 356 of the upper support bracket 352. A lower foam spacer 368 contacts the lower support bracket 338 and the upper support bracket 352. The lower foam spacer 368 is located between the lower seal 360 and the sidewall 324. An upper seal 370 is located between the sidewall 324 and vertical leg 358 of the upper support bracket 352. An upper foam spacer 376 is located above the upper seal 370, and between the vertical leg 358 and sidewall 324. A flexible crack sealant 380 is applied on top of the upper foam spacer 376 to at least the level of the upper platform 340. As described above, any forces that cause deflection in the frame 342 that would cause relative movement of the upper platform 340 are isolated from the sidewall 324.

Figure 20:
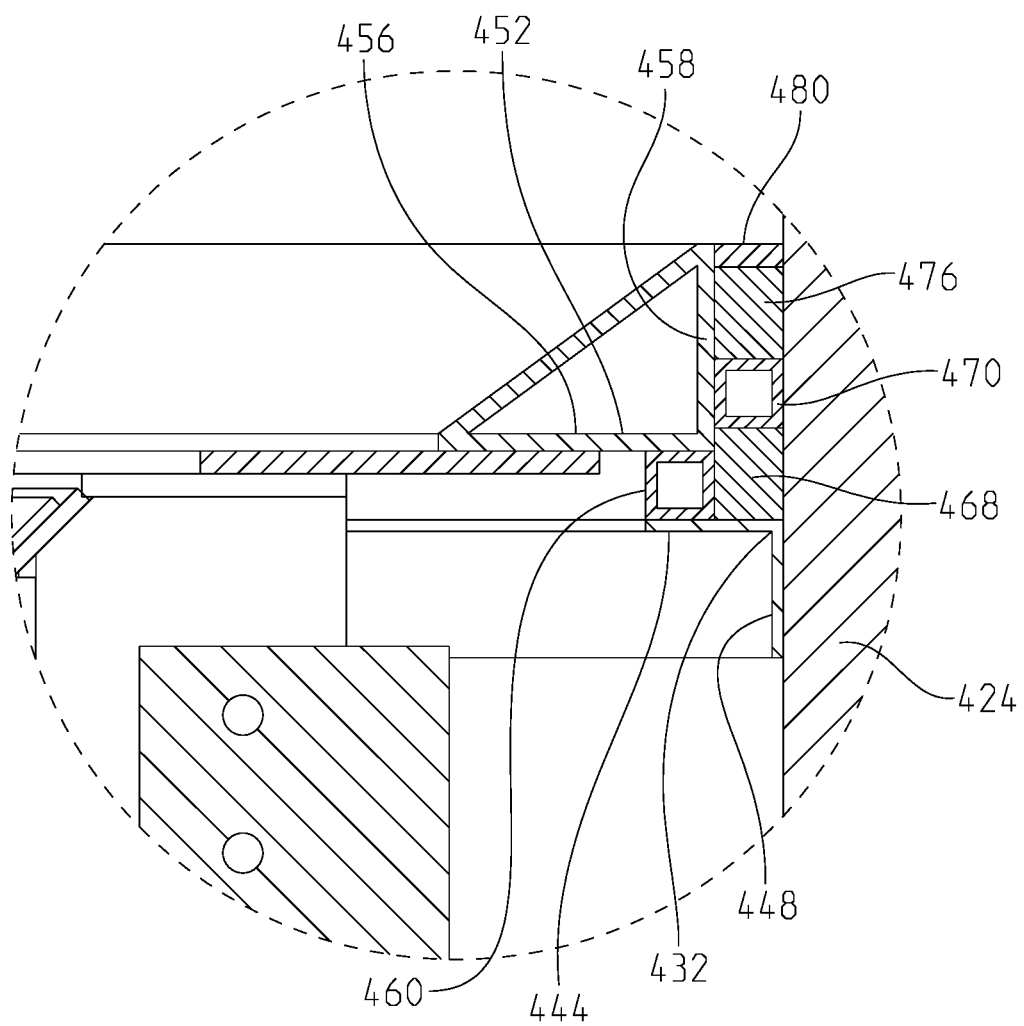
FIG. 20 is a magnified view showing the detail in area 20 in FIG. 19.

FIGS. 17-20 show an unloading system 410 much like unloading system 310. In the case of unloading system 410 a single floor portion 422 extends outwardly of a discharge opening 412 toward rectangular sidewalls 424 of storage structure 425. A reclaiming portion 430 includes the floor portion 422 and upper platform 440 having an upper support bracket 452 that is joined to the upper platform 440. The reclaiming portion 430 is supported by frame 442 above the floor 443 of the storage structure 425. As shown in FIG. 20, a lower support bracket 432 is joined to sidewall 424. The lower support bracket 432 has a horizontal leg 444 and a vertical leg 448. The upper support bracket 452 has a horizontal leg 456 and a vertical leg 458 and is joined to the upper platform 440. A lower seal 460 is located between the horizontal leg 444 of the lower support bracket 432 and the horizontal leg 456 of the upper support bracket 452. A lower foam spacer 468 contacts the lower support bracket 432 and the upper support bracket 452. The lower foam spacer 468 is located between the lower seal 460 and the sidewall 424. An upper seal 470 is located between the sidewall 424 and vertical leg 458 of the upper support bracket 452. An upper foam spacer 476 is located above the upper seal 470, and between the vertical leg 458 and sidewall 424. A flexible crack sealant 480 is applied on top of the upper foam spacer 476 to at least the level of the upper platform 440. Any forces that cause deflection in the frame 442 that would cause relative movement of the upper platform 440 are isolated from the sidewalls 424 because the upper and lower seals 470, 460 will not transmit force to their corresponding sidewalls 424.

What is claimed is:

1. An unloading system for use in a storage structure for containing stored material, said storage structure having a floor and a sidewall, said unloading system comprising:
   a reclaiming portion being spaced from said sidewall of said storage structure;
   said reclaiming portion having a floor portion, said floor portion extending from a discharge opening toward said sidewall of said storage structure, said floor portion of said reclaiming portion being supported above said floor of said storage structure;
   a lower support bracket for being affixed to said sidewall of said storage structure and said lower support bracket having a horizontal leg with an upper surface and a vertical leg;
   an upper support bracket being affixed to said floor portion and having a horizontal leg with a lower surface and a vertical leg having an outer surface;
   a lower seal being located between said horizontal leg of said lower support bracket and said horizontal leg of said upper support bracket, said lower seal having a height that is greater than a distance between said upper surface of said horizontal leg of said lower support bracket and said lower surface of said horizontal leg of said upper support bracket;
   an upper seal being located between said sidewall and said upper support bracket.

2. The unloading system as claimed in claim 1, wherein said reclaiming portion contains an auger rotatable about its central axis for conveying material toward said discharge opening.

3. The unloading system as claimed in claim 1, wherein said floor portion of said unloading system includes a stem wall, said upper support bracket being affixed to the upper portion of said stem wall, and said floor portion of said stem wall having an upper retaining edge located above said discharge opening.

4. The unloading system as claimed in claim 3, wherein said reclaiming portion contains an auger rotatable about its central axis for conveying material toward said discharge opening.

5. The unloading system as claimed in claim 1, wherein floor portion continues to an upper retaining edge being located farther from said floor of said storage structure than said discharge opening.

6. The unloading system as claimed in claim 5, wherein said floor portion includes a stem wall, said upper support bracket being affixed to an upper portion of said stem wall including said upper retaining edge.

7. The unloading system as claimed in claim 1, wherein said upper seal and said lower seal make no contact with each other.

8. An unloading system for use in a storage structure for containing stored material, said storage structure having a floor and a sidewall, said unloading system comprising:
   a reclaiming portion having a floor portion extending from a discharge opening toward said sidewall of said storage structure, said floor portion of said reclaiming portion being supported above said floor of said storage structure, said reclaiming portion being spaced from said sidewall of said storage structure;
   an upper seal located between said sidewall and said floor portion, said upper seal being in simultaneous contact with said floor portion and said sidewall.

9. The unloading system as claimed in claim 8, further comprising a lower support bracket affixed to said sidewall, said lower support bracket having a horizontal leg with an upper surface and a vertical leg, a lower seal being located between said upper surface of said horizontal leg of said lower support bracket and said floor portion, said lower seal being in simultaneous contact with said lower support bracket and said floor portion.

10. The unloading system as claimed in claim 9, wherein said upper and lower seals are spaced from each other and make no contact with each other.

11. An unloading system in combination with a storage structure for containing stored material, said storage structure having a floor and a sidewall, said unloading system comprising:
   a reclaiming portion having a floor portion, said floor portion extending from a discharge opening, said floor portion being supported by a supporting structure, said supporting structure spaced from said sidewall of said storage structure, said reclaiming portion including an upper retaining edge, said upper retaining edge being spaced from said sidewall of said storage structure, said sidewall of said storage structure including a bracket being spaced from said retaining edge and extending toward said reclaiming portion;
   an upper seal located between said upper retaining edge and said sidewall, said upper seal contacting said reclaiming portion and said sidewall;
   a lower seal located between said bracket and said reclaiming portion, said lower seal contacting said bracket and said reclaiming portion.

12. The combination of claim 11, wherein said reclaiming portion contains an auger rotatable about its central axis for conveying material toward said discharge opening.

13. The combination of claim 12, wherein said floor portion includes a stem wall including said upper retaining edge.

14. The combination of claim 13, wherein a portion of said auger of said reclaiming is located between said stem wall and said discharge opening.

\* \* \* \* \*